United States Patent [19]
Brennan

[11] Patent Number: 5,903,628
[45] Date of Patent: May 11, 1999

[54] CALLER INFORMATION (CLID) CONTROLLED AUTOMATIC ANSWER FEATURE FOR TELEPHONE

[75] Inventor: Paul Michael Brennan, East York, Canada

[73] Assignee: Northern Telecom Limited, Montreal, Canada

[21] Appl. No.: 08/745,504

[22] Filed: Nov. 12, 1996

[51] Int. Cl.[6] .................................................. H04M 1/57
[52] U.S. Cl. .................................. 379/88.21; 379/88.16; 379/374
[58] Field of Search .................................. 379/48, 52, 67, 379/70, 76, 82, 88, 89, 127, 142, 179, 189, 183, 215, 216, 217, 242, 243, 244, 245, 246, 247, 251, 252, 253, 254, 372, 373, 374, 375, 376, 350, 354, 355, 387, 388, 418, 420, 88.19, 67.1, 88.16, 88.21

[56] References Cited

U.S. PATENT DOCUMENTS

| | | | |
|---|---|---|---|
| 3,743,791 | 7/1973 | Duff et al. | 379/159 |
| 4,063,047 | 12/1977 | Huryn | 379/159 |
| 4,172,967 | 10/1979 | Porter et al. | 379/167 |
| 4,495,383 | 1/1985 | Lubin et al. | 379/52 |
| 4,720,848 | 1/1988 | Akiyama | 379/88 |
| 5,200,994 | 4/1993 | Sasano et al. | 379/142 |
| 5,237,602 | 8/1993 | Lazik | 379/38 |
| 5,265,145 | 11/1993 | Lim | 379/88 |
| 5,349,638 | 9/1994 | Pitroda et al. | 379/142 |
| 5,377,260 | 12/1994 | Long | 379/142 X |
| 5,526,406 | 6/1996 | Luneau | 379/142 |
| 5,559,860 | 9/1996 | Mizikovsky | 379/142 X |
| 5,602,908 | 2/1997 | Fan | 379/142 |
| 5,604,790 | 2/1997 | Grimes | 379/67 |
| 5,651,055 | 7/1997 | Argade | 379/142 X |
| 5,661,788 | 8/1997 | Chin | 379/142 |

FOREIGN PATENT DOCUMENTS 2112951  7/1995  Canada .

OTHER PUBLICATIONS

X11 Features and Services, Publication No. 553–3001–305, 1989 Northern Telecom.

*Primary Examiner*—Scott Weaver

[57] ABSTRACT

On receiving a new call, a controller in a telephone station apparatus compares the incoming caller information with caller information in stored records. On a match, an associated name is spoken over a handsfree speaker and then the controller places the telephone station apparatus in a handsfree off-hook condition. In this way, someone in a hands-busy situation or a handicapped individual may have calls from pre-selected callers automatically connected. The controller may also store a two-way or one-way communication path indication with each record and, accordingly, establish either one-way communication path from the calling party to the telephone station apparatus or a two-way communication path to and from the telephone station apparatus.

16 Claims, 4 Drawing Sheets

5,903,628

CALLER INFORMATION (CLID) CONTROLLED AUTOMATIC ANSWER FEATURE FOR TELEPHONE

BACKGROUND OF THE INVENTION

1. Field of the Invention

This invention relates to a method for selectively automatically answering a telephone station apparatus in a telephone network and telephone station apparatus for a telephone network.

2. Description of the Related Art

U.S. Pat. No. 5,265,145 issued Nov. 23, 1993 to Lim discloses a telephone station apparatus which can speak the name of a caller. This helps the called party, who might otherwise be occupied, to decide whether or not to take the call. A drawback with this arrangement is that it may still be inconvenient for the called party to drop what is his doing and take the call.

The subject invention seeks to overcome drawbacks of known systems.

SUMMARY OF THE INVENTION

According to the present invention, there is provided a method for selectively automatically answering a telephone station apparatus in a telephone network, comprising the steps of: detecting incoming caller information from an incoming call at said telephone station apparatus; searching a list of caller information stored in a memory of said telephone station apparatus for caller information matching said incoming caller information; and on finding matching caller information, placing said telephone station apparatus in an off-hook handsfree state.

In accordance with another aspect of this invention, there is provided a telephone station apparatus for a telephone network, comprising: a memory for storing a list of records including caller information; a detector for detecting caller information of an incoming call; at least one switch for switching said telephone station apparatus into a handsfree off-hook state; a controller operatively associated with said memory, said detector, and said at least one switch for receiving incoming caller information from said detector, accessing said memory and searching said list of records for caller information matching said incoming caller information and, on finding matching caller information, operating said at least one switch to switch said telephone station apparatus to a handsfree off-hook state.

DETAILED DESCRIPTION OF THE PREFERRED EMBODIMENTS

Figure 1:
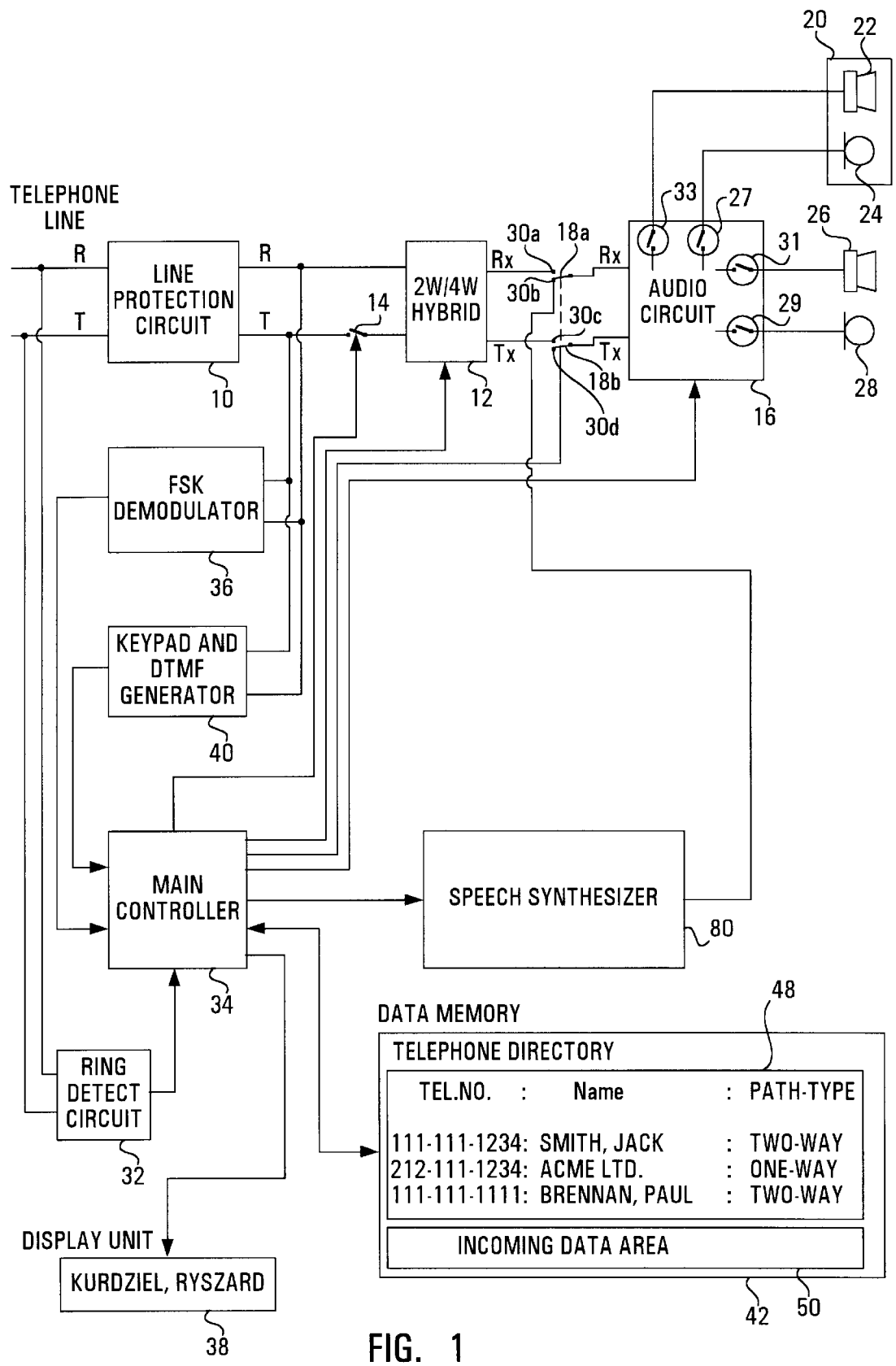
FIG. 1 is a block diagram of an example telephone station apparatus made in accordance with the present invention.

Referring to FIG. 1, the telephone station apparatus is connected to tip (T) and ring (R) leads of a telephone line which is connected to a switching facility, for example a central office (not shown).

As is conventional, the telephone station apparatus has a line protection circuit 10 connected to a hybrid circuit 12 via a hook switch 14. The hybrid circuit 12 is connected to an audio circuit 16 via movable switch contacts 18a and 18b which are operable to select a communication path or an announcement path. The audio circuit 16 is connected to a handset 20—having a receiver 22 and a transmitter 24—and to a handsfree speaker 26 and a handsfree microphone 28. The audio circuit includes a transmitter switch 27 and receiver switch 33 as well as a microphone switch 29 and speaker switch 31. When the hook switch 14 is closed, the telephone station apparatus is in an off-hook condition. The communication path is selected when both movable switch contacts 18a and 18b contact stable switch contacts 30a and 30c, respectively. The announcement path is selected when the movable switch contacts 18a and 18b contact the stable switch contacts 30b and 30d, respectively. In the off-hook condition with the communication path established and switches 29 and 31 closed, a user can communicate via the telephone line by way of the handsfree speaker 26 and handsfree microphone 28. With switches 27 and 33 closed and switches 29 and 31 open, the user can communicate over the handset.

The telephone station apparatus also has a ring detect circuit 32 which is responsive to a ringing signal on the telephone line, for providing an alerting signal audible to the user as well as a signal to a main controller 34, that a call has arrived. Incoming Frequency Shift Key (FSK) data of ASCII code identifying a calling party is demodulated by an FSK demodulator 36 and the demodulated signal is provided to the main controller 34. An LCD display unit 38 displays the identification of the calling party. A keypad 40 includes a dual-tone multifrequency (DTMF) generator, for generating signalling which is sent to the telephone line via the line protection circuit 10; the keypad also includes control keys for inputting control signals to the main controller 34. The controller is also operatively connected to audio circuit 16, the hybrid circuit 12, and the movable switch contacts 18a, 18b.

The telephone station apparatus has a data memory 42 and a text-to-speech converter—speech synthesizer 80—which are connected to the main controller 34. The data memory 42 is organized to have a telephone directory 48 and an incoming data area 50.

Under control by main controller 34, the user can enter a plurality of telephone numbers and associated names into the telephone directory 48, as well as an indication of whether communication with each telephone number is to be on a one-way or two-way communication path. The user pushes keys (not shown) of the keypad 40 to enter a telephone/name/path-type record and pushes a SAVE key (not shown). The entered telephone number/name/path-type record (e.g., 111-111-1111: Brennan, Paul: two-way) is stored in the telephone directory 48 by the main controller 34. In the same manner, other telephone number/name/path-type records are entered into the telephone directory 48. While storing these records in the telephone directory 48, the main controller 34 sorts them in alphabetical order of the name.

Figure 2:
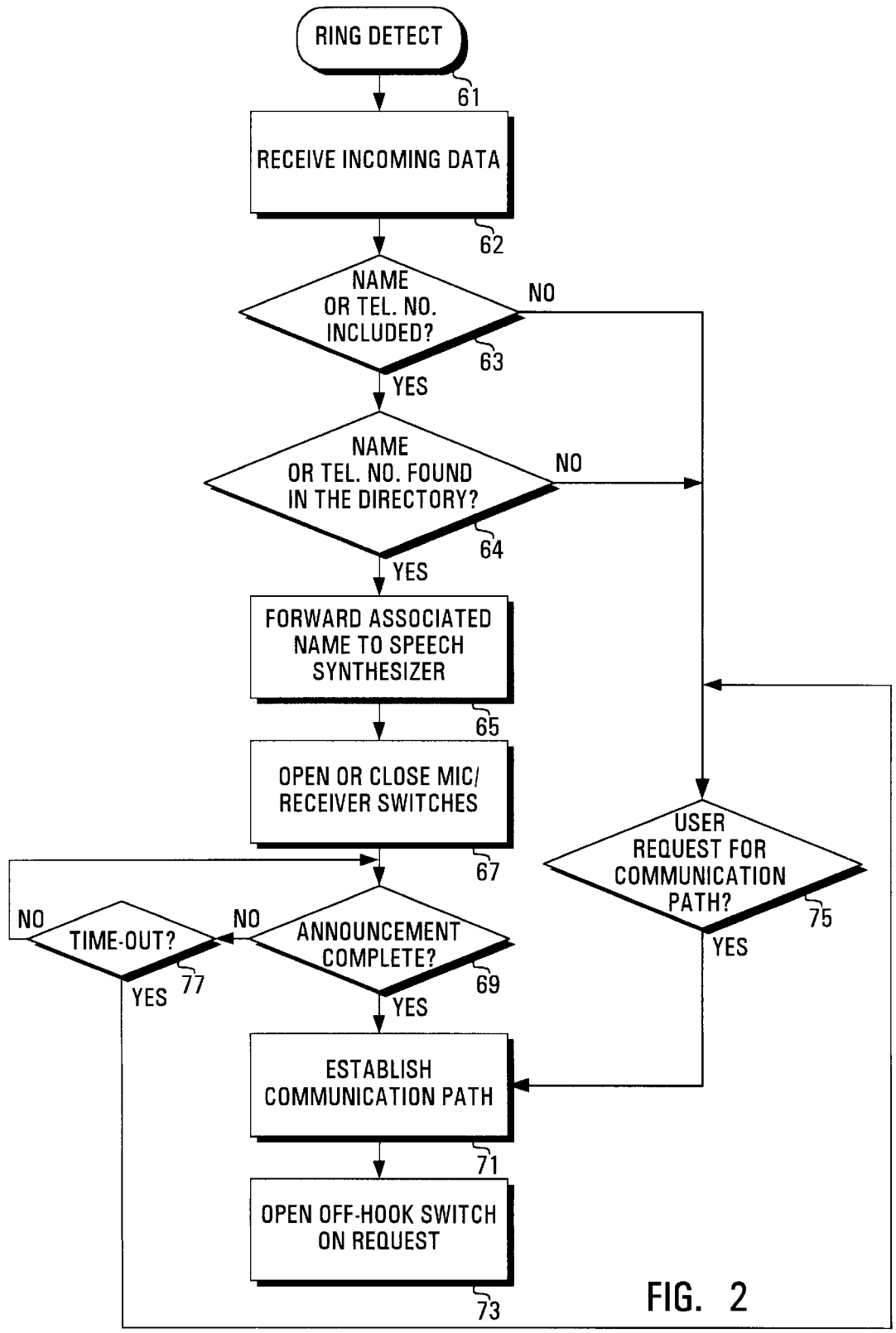
FIG. 2 is a flow chart illustrating the operation of the telephone station apparatus of FIG. 1.

Referring to FIGS. 1 and 2, when the hook switch 14 is open (i.e., on-hook condition), the main controller 34 positions movable switch contacts 18a and 18b in contact with the stable switch contacts 30b and 30d, respectively. This establishes an announcement path, with the receive terminal Rx of the audio circuit 16 connected to the speech synthesizer 80. The main controller 34 also prompts the audio circuit to make the handsfree speaker 26 active by closing switch 31. En this on-hook "ready" state, switches 27, 29, and 33 of the audio circuit are open.

When the user is called, the ring detect circuit 32 detects a ring signal (step 61). Upon completion of a predetermined number of ring cycles (usually only one), the FSK demodulator 36 receives incoming FSK data of 1200 baud ASCII code which should contain information identifying the calling party, namely, a telephone number (often referred to as the "CLID"—calling line identification) and/or a name of such party (step 62). The FSK demodulator 36 decodes the ASCII code of the incoming FRK data and the decoded ASCII data is stored in the incoming data area 50 by the main controller 34. In a case where the incoming stored data includes a decoded telephone number (e.g., 111-111-1111) or decoded name (i.e., YES in step 63), the main controller 34 compares the decoded telephone number (or, if no telephone number, the decoded name) to the telephone numbers (or names) previously entered into the telephone directory 48 (step 64). If there is a match—i.e., the decoded telephone number (or name) matches a telephone number (or name) in one of the records in telephone directory 48—(i.e., YES in step 64), the name in the matching record is read from the telephone directory 84 by the main controller 34. The read name is a series of ASCII characters. The name is sent to the display unit 38 which in turn displays the name. At the same time, the main controller 34 forwards the read name to the speech synthesizer 80 (step 65) which translates the read name into a voice announcement signal which is output to the handsfree speaker. The handsfree speaker 26 then announces the name (e.g., "PAUL BRENNAN").

The controller also reads the path-type indication in the matching record. If this is a "two-way" indication, the controller closes switch 29 in the audio circuit 16 to the microphone 28. On the other hand, if this is a "one-way" indication, the controller disables switches 27 and 29 in their open position (step 67). When the controller senses (at step 69) that the speech synthesizer 80 has completed the announcement (either by the synthesizer returning a "task completed" message to the controller or by the controller monitoring the status of the synthesizer and sensing completion when the synthesizer switches from a "busy" to a "ready" state), the controller positions movable switch contacts 18a, 18b in contact with stable switch contacts 30a, 30c and operates the off-hook switch 14 to establish a handsfree communication path to the telephone line (step 71).

In the result, a user will first hear the name of a caller announced and the call will then be connected. If the path-type is two-way, the user may then speak to the caller via the microphone 28 and the caller may be heard over the speaker 26. This operation is useful where the user is handicapped, infirm, or working in a hands-busy situation. If the user were able to pick-up handset 20 then, audio circuit will open switches 29 and 31 to deactivate microphone 28 and speaker 26 and will close switches 27 and 33 to activate transmitter 24 and receiver 22.

In a well-known manner, a call could be terminated by the user pressing a key on keypad 40, the user lifting and returning handset 20 into its cradle, or on a time-out after the calling party hangs up (step 73).

If the path-type were one-way, then the caller may speak to the user, but the receiver 24 and microphone 28 are disabled so that the caller will not hear the user. This operation would be useful where a remote mechanism periodically called with an information update (e.g., the status of a machine or the value of a stock). In such instance, if the user picked up handset 20, the disabling of switch 27 by controller 34 would prevent the audio circuit from closing this switch.

If the incoming stored data does not include a telephone number or name, or neither the telephone number nor name matches one in the telephone directory 48, then the telephone station apparatus will ring in a conventional fashion and the controller takes no action unless it senses from audio circuit 16 that handset 20 is removed from its cradle or an "answer" button is pressed on keypad 40 (step 75). In either instance, controller 34 then establishes a communication path (step 71). Similarly, in the case of some malfunction in the speech synthesizer such that no indication is received that an announcement is completed, the controller takes no action (step 77) unless it senses from audio circuit 16 that handset 20 is removed from its cradle or an "answer" button is pressed on keypad 40.

While the system of FIGS. 1 and 2 has been described for use with an analog wire line telephone system, it will be obvious that the telephone system has equal application for a digital telephone system or a wireless telephone system.

Figure 3:
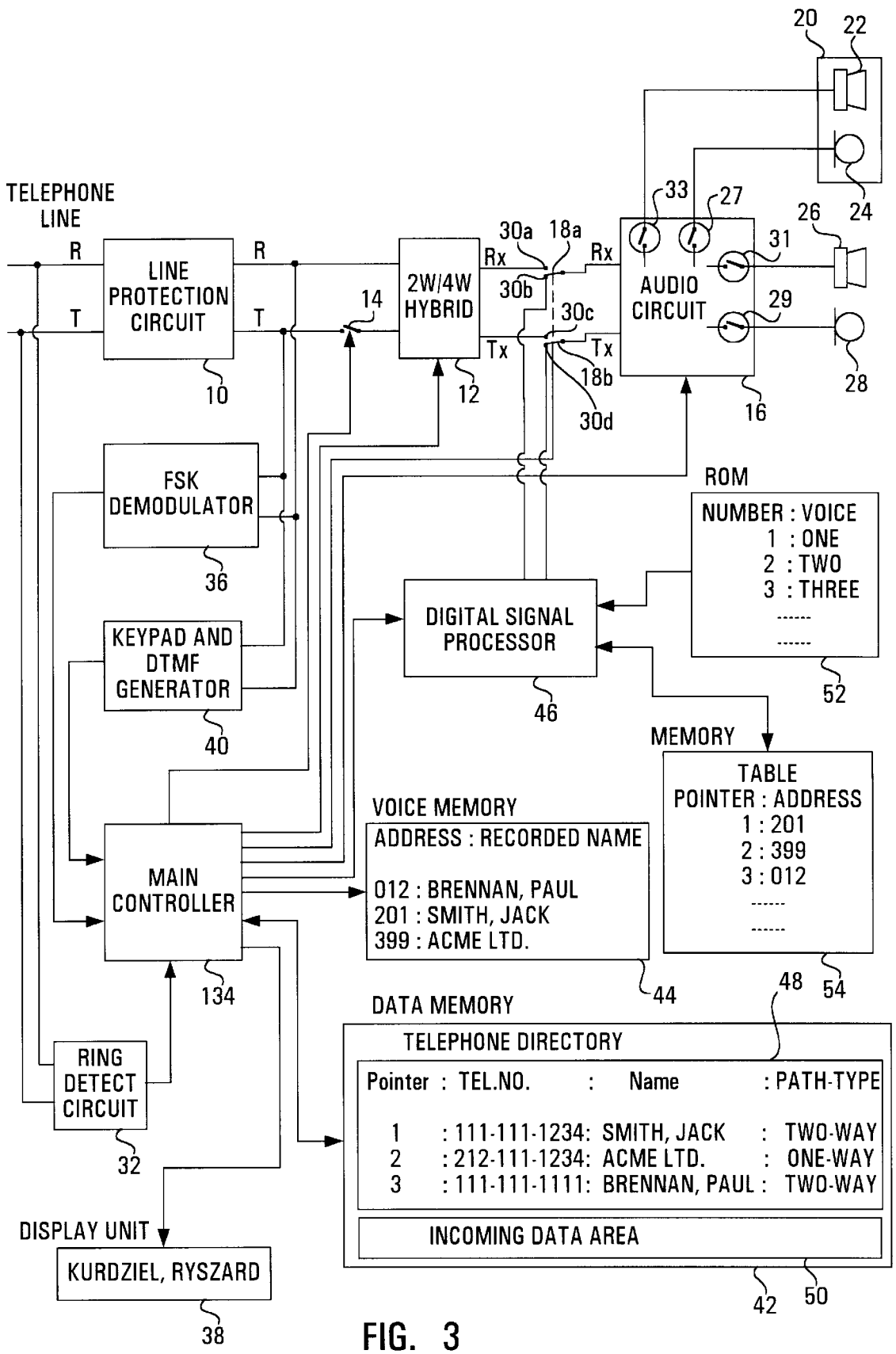
FIG. 3 is a block diagram of another example telephone station apparatus made in accordance with the present invention.

FIG. 3 illustrates a further embodiment of a telephone system made in accordance with this invention. Turning to FIG. 3, wherein like parts have been given like reference numerals, the telephone system has a voice memory 44, a digital signal processor (DSP) 46, a read-only-memory (ROM) 52, and a table memory 54 in place of speech synthesizer 80. The voice memory and DSP are connected to controller 134; the DSP is connected to the ROM and table memory.

A user may enter a telephone number, associated name, and path-type indication and save same in the telephone directory 48, as before. This prompts the controller 134 to establish the announcement path and close microphone switch 29; the user then speaks the associated name into the microphone 28. The voice utterances are then recorded into the voice memory 44 through the audio circuit 16 and the DSP 46. The voice announcements are recorded at sequential addresses in the order of name entry. A pointer number is assigned to each telephone number/name/path-type record stored in the telephone directory 48. The assigned pointer number is fed to the DSP 46 by the main controller 134. The address where the corresponding voice announcement is recorded is also fed to the digital signal processor 46. The digital signal processor 46 constructs a table in the memory 54 containing the pointer numbers and the corresponding addresses.

In the case of an incoming call, on the controller finding a matching telephone number or name in the telephone directory, the main controller 134 makes a linkage between the data memory 42 and the DSP 46. The pointer number (e.g., 3) associated with the matched entry is fed to the DSP 46 by the main controller 134. The DSP 46 picks up the address (e.g., 012) which corresponds to the pointer number, from the table of the memory 54. En response to the address picked up, the DSP 46 reads the voice announcement recorded at that address (e.g., 012) of the voice memory 44. The DSP 46 constructs a voice message signal in response to the voice announcement. The constructed voice message signal is supplied from the DSP 46 to the audio circuit 16. The audio signal volume of the voice message is adjusted by the audio circuit 16. The voice message signal is fed to the handsfree speaker 26 so that a voice message of the name (e.g., "PAUL BRENNAN") is announced, and the called party may know the identity of the calling party.

The systems of FIGS. 1 to 3 could be modified such that if no path-type were entered in a record or the path-type in the record indicated "no automatic answer", the controller would announce the call as aforedescribed but would not establish a communication path, instead letting the telephone station apparatus ring in a conventional fashion.

Figure 4:
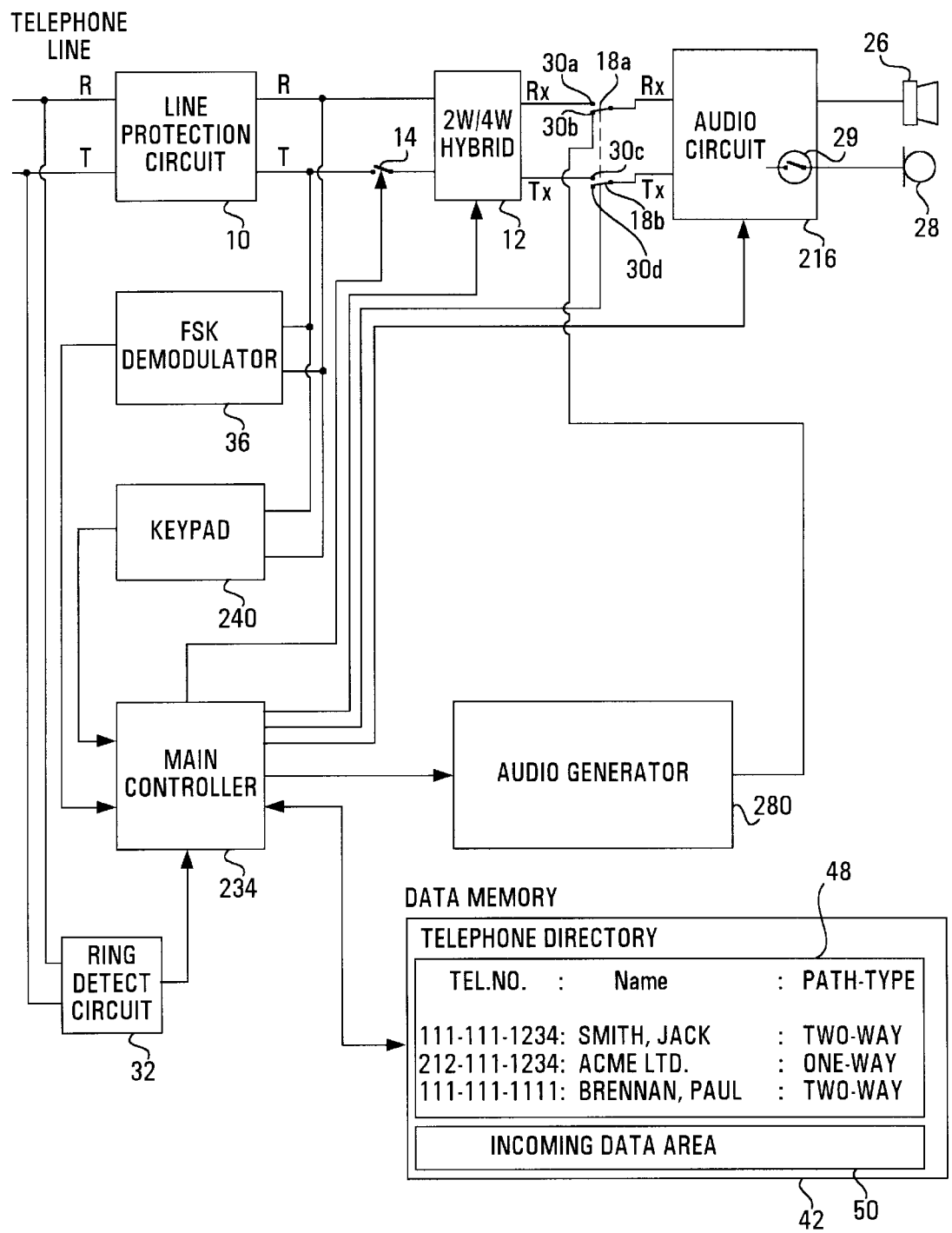
FIG. 4 is a block diagram of yet another example telephone station apparatus made in accordance with the present invention.

FIG. 4 illustrates a simplified embodiment of the invention; turning to this figure wherein like parts to parts of FIG. 1 have been given like numerals, it will be noted that the keypad and DTMF generator of FIG. 1 has been replaced by keypad 240. Further, the handset and caller name display of FIG. 1 have been omitted and the speech synthesizer of FIG. 1 has been replaced with audio generator 280.

In use of the apparatus of FIG. 4, a user may enter telephone number/name/path-type records on keypad 240 as before. When an incoming call arrives, the controller 234 will receive any associated caller information from FSK Demodulator 36 and will search for matching information in telephone directory 48, as in the embodiment of FIG. 1. On finding a match, the controller will prompt audio generator 280 to generate an audio signal (in the nature of a beep, distinctive ring, or tone) on the announcement path to the handsfree speaker 26 and then establish a (one-way or two-way) communication path between the caller and the user. With this operation, the audio signal warns the user of an incoming call which is about to be connected. The user will, therefore, know that the call is from one of the callers found in the telephone directory but will not know which one of these callers is actually calling in advance of the call being connected. Because the apparatus of FIG. 4 has no DTMF generator, it may not be used to place outgoing calls. Further, because the apparatus lacks a handset, it may only be used in handsfree mode. In view of this, there is no switch in the audio circuit 216 to disable the handsfree speaker. Of course if outgoing call facility were required, or use with a handset was desired, the apparatus could be modified accordingly.

In a more sophisticated system, the path-type field of each record in telephone directory 42 of any of the embodiments of FIGS. 1 to 4 could be replaced with a path-type/mailbox field. In this instance, either a path-type could be entered in such field of a record, as aforedescribed, or a mailbox number could be entered. If a mailbox number were entered in a record and the controller determined, on receipt of an incoming call, that this record contained information matching caller information from the incoming call, then the controller would read the mailbox number and direct the call to a voice mailbox identified by this number, rather than connect the call through to the user.

Other modifications will be apparent to those skilled in the art and, therefore, the invention is defined in the claims.

What is claimed is:

1. A method for selectively automatically answering a telephone station apparatus in a telephone network, comprising the steps of:

detecting incoming caller information from an incoming call at said telephone station apparatus;

searching a list of caller information stored in a memory of said telephone station apparatus for caller information matching said incoming caller information; and in response to finding matching caller information, automatically placing said telephone station apparatus in an off-hook handsfree state where a voice communication path is established from a caller over at least a handsfree speaker of said telephone station apparatus.

2. The method of claim 1 including the step of, on finding matching caller information, disconnecting a handsfree microphone of said telephone station apparatus prior to placing said telephone station apparatus in said off-hook handsfree state.

3. The method of claim 1 wherein said list of caller information comprises a list of records of caller information, each record including a "two-way" voice path indication or a "one-way" voice path indication, and including the step of, on finding matching caller information in a record, retrieving said voice path indication associated with said record and, if said voice path indication is a "one-way" voice path indication, disconnecting a handsfree microphone of said telephone station apparatus prior to placing said telephone station apparatus in said off-hook state.

4. The method of claim 1 including the step of, on finding matching caller information, announcing a pre-defined announcement on the handsfree speaker of said telephone station apparatus prior to placing said telephone station apparatus in said handsfree off-hook state.

5. The method of claim 4 wherein said pre-defined announcement comprises one of a tone, beep, and ring.

6. The method of claim 1 including the step of, on finding matching caller information, announcing said matching caller information on the handsfree speaker of said telephone station apparatus prior to placing said telephone station apparatus in said handsfree off-hook state.

7. The method of claim 3 wherein said memory stores text in association with each record and including the step of, on finding matching caller information in a given record, retrieving text associated with said given record and announcing said associated text on the handsfree speaker of said telephone station apparatus prior to placing said telephone station apparatus in said handsfree off-hook state.

8. The method of claim 3 including the step of, on finding matching caller information, retrieving a voice announcement associated with said matching caller information stored in a voice memory of said telephone station apparatus and announcing said associated voice announcement on the handsfree speaker of said telephone station apparatus prior to placing said telephone station apparatus in said handsfree off-hook state.

9. A telephone station apparatus for a telephone network, comprising:

a memory for storing a list of records including caller information;

a detector for detecting caller information of an incoming call;

at least an off-hook switch and a handsfree speaker switch switch for switching said telephone station apparatus into a handsfree off-hook state;

a controller operatively associated with said memory, said detector, and at least said off-hook switch and said handsfree speaker switch for receiving incoming caller information from said detector, accessing said memory and searching said list of records for caller information matching said incoming caller information and, in response to finding matching caller information, automatically operating said at least one switch to switch said telephone station apparatus to a handsfree off-hook state.

10. The telephone station apparatus of claim 9 including a microphone switch, said controller operatively associated with said microphone switch for, on finding a record having matching caller information, opening said microphone switch.

11. The telephone station apparatus of claim 9 including a microphone switch, said controller being operatively associated with said microphone switch and wherein each record in said memory stores one of a "two-way" voice path indication and a "one-way" voice path indication, said controller for, on finding a record having matching caller information, retrieving said voice path indication associated with said record having matching caller information and, if said voice path indication is a "one-way" voice path indication, opening said microphone switch.

12. The telephone station apparatus of claim 9 including a speaker and a text-to-speech converter for announcing any text input thereto on said speaker and for indicating when an announcement is completed, said controller operatively associated with said converter for, on finding a record with matching caller information, inputting said matching caller information to said converter and awaiting an indication an announcement is completed before operating at least said off-hook switch and said handsfree speaker switch.

13. The telephone station apparatus of claim 9 including a speaker and a text-to-speech converter for announcing any text input thereto on said speaker and for indicating when an announcement is completed, said memory for storing text in association with each record, said controller for, on finding a record with matching caller information, retrieving said text associated with said record with matching caller information, said controller operatively associated with said converter for, on finding a record with matching caller information, inputting said associated text to said converter and awaiting an indication an announcement is completed before operating at least said off-hook switch and said handsfree speaker switch.

14. The telephone station apparatus of claim 9 including a speaker and a voice memory for storing voice prompts in association with records, said controller for, on finding a record having matching caller information, retrieving any voice prompt associated with said record having matching caller information and inputting said voice prompt to said speaker before operating at least said off-hook switch and said handsfree speaker switch.

15. The telephone station apparatus of claim 9 including a keypad and wherein said controller is operatively associated with said keypad, said controller for, on receipt of a pre-set indication from said keypad, storing data entered from said keypad in said list of records.

16. The telephone station apparatus of claim 9 including a speaker and a tone generator for generating a tone on said speaker, said controller operatively associated with said generator for, on finding a record with matching caller information, prompting said generator to generate a tone before operating at least said off-hook switch and said handsfree speaker switch.

\* \* \* \* \*